J. J. GILROY.
POWER TRANSMITTING MECHANISM.
APPLICATION FILED MAR. 9, 1905.
898,870.
Patented Sept. 15, 1908.
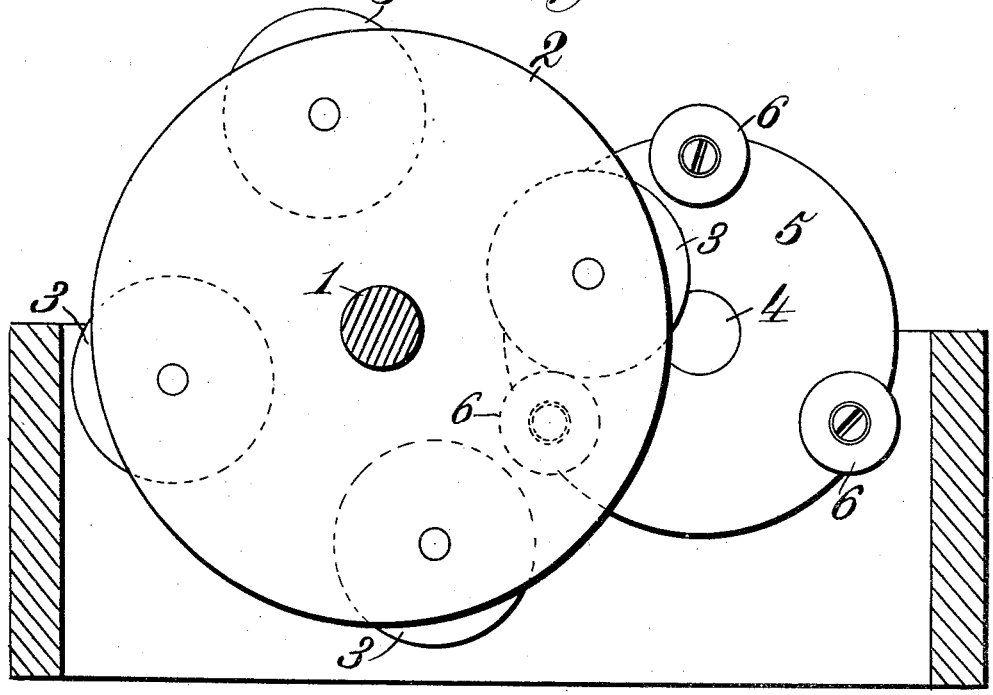
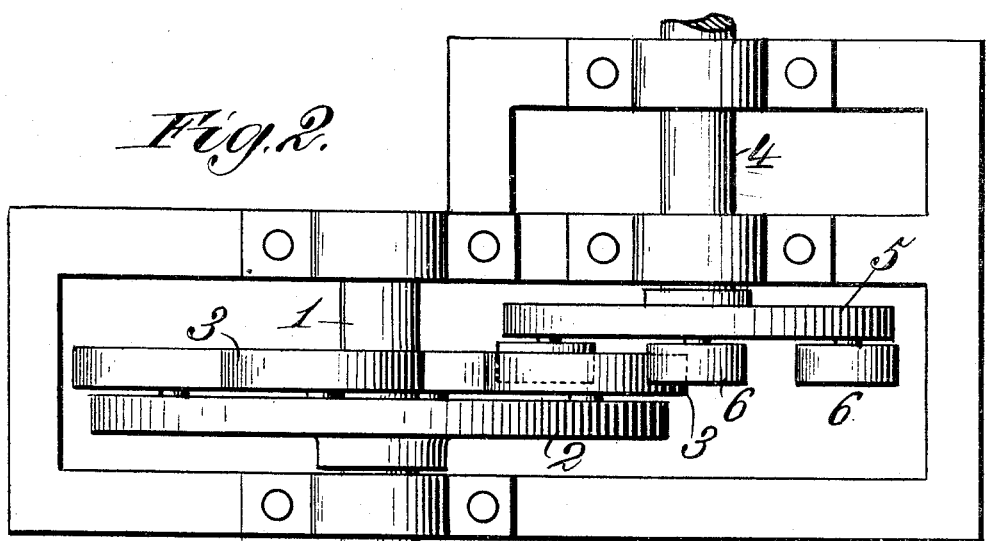
Witnesses.
Robert Ewart,
James L. Norris.
Inventor,
James J. Gilroy,
By James L. Norris,
Attys.

UNITED STATES PATENT OFFICE.

JAMES J. GILROY, OF LOST CREEK, PENNSYLVANIA.

POWER-TRANSMITTING MECHANISM.

No. 898,870.      Specification of Letters Patent.      Patented Sept. 15, 1908.

Application filed March 9, 1905. Serial No. 249,255.

*To all whom it may concern:*

Be it known that I, JAMES J. GILROY, a citizen of the United States, residing at Lost Creek, in the county of Schuylkill and State of Pennsylvania, have invented new and useful Improvements in Power-Transmitting Mechanism, of which the following is a specification.

This invention relates to power transmitting mechanism, particularly intended for coöperation with parallel shafts, one of which may be the driving or line shaft, and the other a driven or power transmitting shaft.

In the use of ordinary intermeshing toothed gears for transmitting motion from one shaft to another, more or less friction exists, and a portion of the transmitted power is absorbed or lost by reason of the presence of such friction between the intermeshing elements. In power transmitting devices employing friction disks there is also a loss of power and an unreliable transmission of motion due to an impositive contact of the disks. Furthermore, in power transmitting devices in connection with shafts having movable elements directly held in the periphery, the friction is materially reduced as compared to toothed gears and smooth friction disks, but the strain on the heads carrying these movable peripheral devices having effect in radial directions with respect to such heads is a detriment, especially to the bearings of the shafts involved, as the tendency is to force the shafts apart and cause such shafts to wear against a portion of their boxes with greater force than the remaining parts of such boxes, and as such wear ensues the motion of the shafts and the transmission of power from one to the other is disadvantageously effected.

In the present mechanism two disks or heads of different diameters are positioned in overlapping relation, one being carried by a driving shaft and the other by a driven shaft, and each having thereon a series of rollers of different diameters, and the larger rollers on the disk of greater diameter moving in and out with respect to the smaller rollers on the other disk, and avoiding strain on the bearings of the shafts in view of their movable application and the particular manner in which they exert an operative tension with relation to the shafts, and which will be more fully hereinafter set forth.

In the drawings: Figure 1 is a sectional elevation of mechanism embodying the features of the invention. Fig. 2 is a top plan view of the same.

Similar numerals of reference are employed to indicate corresponding parts in the views.

The numeral 1 designates a driving shaft, which may be of any length, or be what is usually known as an engine shaft; or in some instances it may be a shaft to which the power from an engine or motor is transmitted. On this shaft is fixed, to rotate therewith, a head or disk 2 having a series of rollers 3 disposed on one face thereof and lying close to said face and projecting inwardly over the latter, the pintles or supporting means for the said rollers being preferably located inwardly a distance from the periphery of the disk 2.

Arranged adjacent to the shaft 1 is a power transmitting shaft 4, having a head or disk 5 fixed thereto, and of smaller dimensions than the head or disk 2. On the face of the head or disk 5, adjacent the head or disk 2 carrying the rollers 3, rollers 6 are applied and have their pivots or supporting means also applied to the disk 5 a distance inwardly from the periphery of said latter disk, said disk 5 being materially less in diameter than the disk 2. The rollers on the disk 2 are four in number, and those on the disk 5 are three in number; and it has been found in practice that this proportion gives the best results, or, in other words, one disk should have thereon an odd number of rollers and the other an even number to effect a positive registration and accurate contact of the one set of rollers by the other. The distance between the two sets of rollers is such that the set carried by the one head or disk can move inwardly and outwardly between the set of rollers carried by the other head or disk, and the rollers 3, for instance, regularly contact with the rollers 6 with such force and in such directions as to cause the motion of the shaft 1 to be regularly transmitted to the shaft 4. As the rollers 3 and 6 move on their axes, friction of the coöperating parts will be practically overcome, and the most forceful contact between the rollers of the two heads will result when the engaging rollers have their vertical diameters in alinement and at such time either a downward or an upward thrust will be imparted by one set of rollers to the other, in accordance with the direction of rotation of the shaft 1. Before each roller 6 becomes operatively disengaged from two of the rollers 3, for example, a succeeding roller 6 will have passed in the space between the succeeding roller 3, one of the latter being that just engaged by the preceding roller 6. As will be understood, the rollers 6 move toward the rollers 3 in true arcs, and the rollers of the two heads or disks are regularly spaced to permit this operation. During the operation of the rollers on the contiguous faces of the overlapping disks 2 and 5, they pass partially over each other, and being individually free to rotate will overcome any tendency to working apart or forcing the two shafts outwardly and irregularly wearing the shaft bearings, and consequently the motion of both shafts will be regular, and lost motion due to resisting friction reduced to a minimum.

It is proposed to use the improved power transmitting mechanism just described wherever it may be found applicable. By having the disks differing in diameter the one shaft, or that carrying the smaller disk, will be caused to rotate faster or have a greater number of revolutions than the other shaft on the same principle as toothed gearing or friction disks varying in diameter on adjacent shafts and transmitting power from one to the other.

It is obvious that one rotation of the larger disk on the driving shaft will produce a greater number of rotations of the smaller disk of the driven shaft, and the difference in diameters of the sets of rollers, which is in proportion to the diameters of the disks, permits the proper meshing operation of the sets of rollers and also the use of a greater number of rollers on one disk than on the other within given proportions of the two disks. The two disks have their contiguous faces in parallel planes and the rollers on the disks also have their inner faces parallel with the adjacent faces of the disks, the overlap of the one disk with respect to the other being carried out to such an extent as to produce a practical operating edge contact between the two sets of rollers, the disks being at such distance apart that the rollers thereon when in contact are disposed between the overlapping portions of the disks and thus braced or reinforced. The use of rollers projecting inwardly from the faces of the opposing disks insures an easy or anti-frictional coöperating relation of the two heads or disks, and furthermore, by locating the pintles of the rollers inwardly from the peripheries of the disks the rollers are caused to have contact nearer the centers of the disks with increased operating power, and fracture of the disks between the fulcrums of the rollers and the peripheries of the disks is less liable to occur in view of the greater amount of metal or material between the fulcrums and disk peripheries than would be the case if the fulcrums were located at the edge or on the peripheries of the said disks.

Having thus described the invention, what is claimed, is:

1. In a power transmitting mechanism, the combination of shafts in the same horizontal plane and also in parallel planes and extending in opposite directions, one terminal of each shaft being adjacent to the terminal of the other, heads or disks fixed to the contiguous terminals of the two shafts and having their faces partially overlapping and in planes parallel to each other, the disks differing in diameter, and sets of rollers on the faces of the respective disks, the rollers on the disks of greater diameter being of greater diameter than the rollers on the smaller disk, the rollers being movable inwardly and outwardly over the disks between each other, the inner opposing faces of the rollers being also in planes parallel with the contiguous faces of the disks, and the rollers of one disk having the most forceful contact with the rollers of the other disk when arriving in coöperative relation with the vertical diameters of the latter rollers and subsequently moving past such diameters of the respective rollers to avoid forcing the shafts with greater pressure against parts of the shaft bearings than against the remaining portions of said bearings.

2. In a power transmitting mechanism, the combination of shafts arranged in the same horizontal plane, heads or disks of differing diameters fixed to the shafts and having overlapping contiguous faces, and sets of rollers held on the contiguous faces of the heads for edge engagement of one set of rollers with the other set of rollers, the rollers having their axes located inwardly a distance from the peripheries of their respective heads or disks to bring the said rollers nearer the centers of the disks, and the rollers on the larger disk being of greater diameter than those on the smaller disk.

3. In a power transmitting mechanism, the combination of a driving shaft, a head or disk fixed thereon, rollers having their axes located inwardly a distance from the periphery of the disk, a driven shaft, a head or disk fixed on the said driven shaft and of less diameter than the aforesaid head or disk, rollers arranged on the latter disk similarly to those on the said head or disk of the driving shaft, the opposing faces of the two disks in parallel planes and overlapping, and the rollers on the head or disk of the driving shaft being greater in diameter than those on the head or disk of the driven shaft and both sets of rollers having their inner faces parallel with the contiguous faces of the disks carrying the same.

4. In a power transmitting mechanism, the combination of parallel shafts, heads or disks fixed to the shaft terminals and having overlapping contiguous faces, the heads or disks differing in diameter, and rollers on the contiguous faces of the heads or disks, the axes of the rollers being located inwardly a distance from the peripheries of the respective heads or disks and the rollers of one disk contacting with and movable inwardly and outwardly between the rollers of the other disk.

5. In a power transmitting mechanism, the combination of a driving shaft and a driven shaft, a head fixed to the driving shaft, a head fixed to the driven shaft and of less diameter than the head upon the driving shaft, said heads having overlapping contiguous faces, and rollers on the contiguous faces of the heads, the rollers upon the head carried by the driving shaft being of greater diameter than the rollers upon the head carried by the driven shaft, and the rollers of one head contacting with the rollers of the other head.

In testimony whereof I have hereunto set my hand in presence of two subscribing witnesses.

JAMES J. GILROY.

Witnesses:
 CHARLES S. HYER,
 GEO. W. REA.